No. 823,549. PATENTED JUNE 19, 1906.
J. & W. REAGAN.
FUEL FEEDING DEVICE FOR BOILER FURNACES.
APPLICATION FILED MAY 8, 1905.
4 SHEETS—SHEET 1.
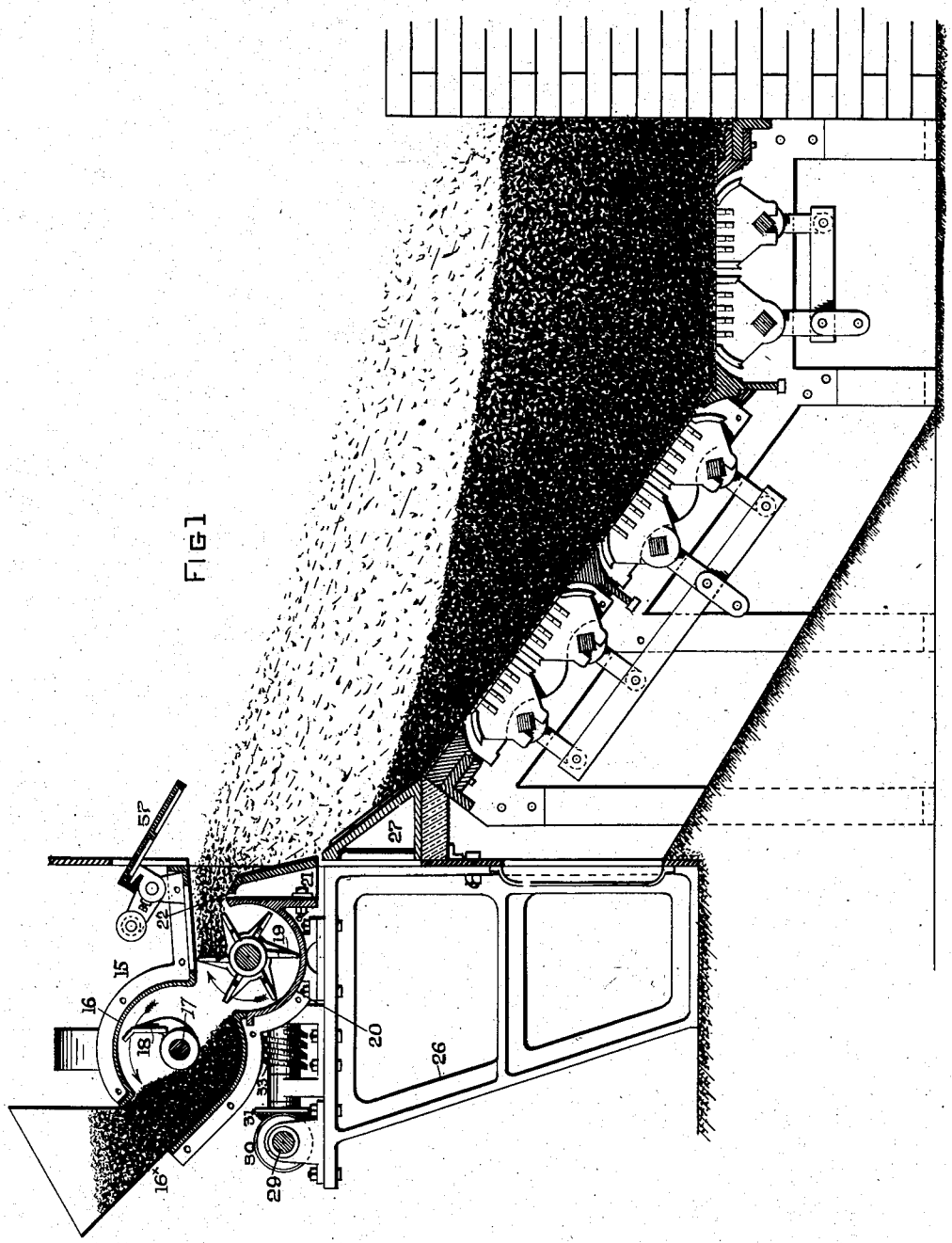

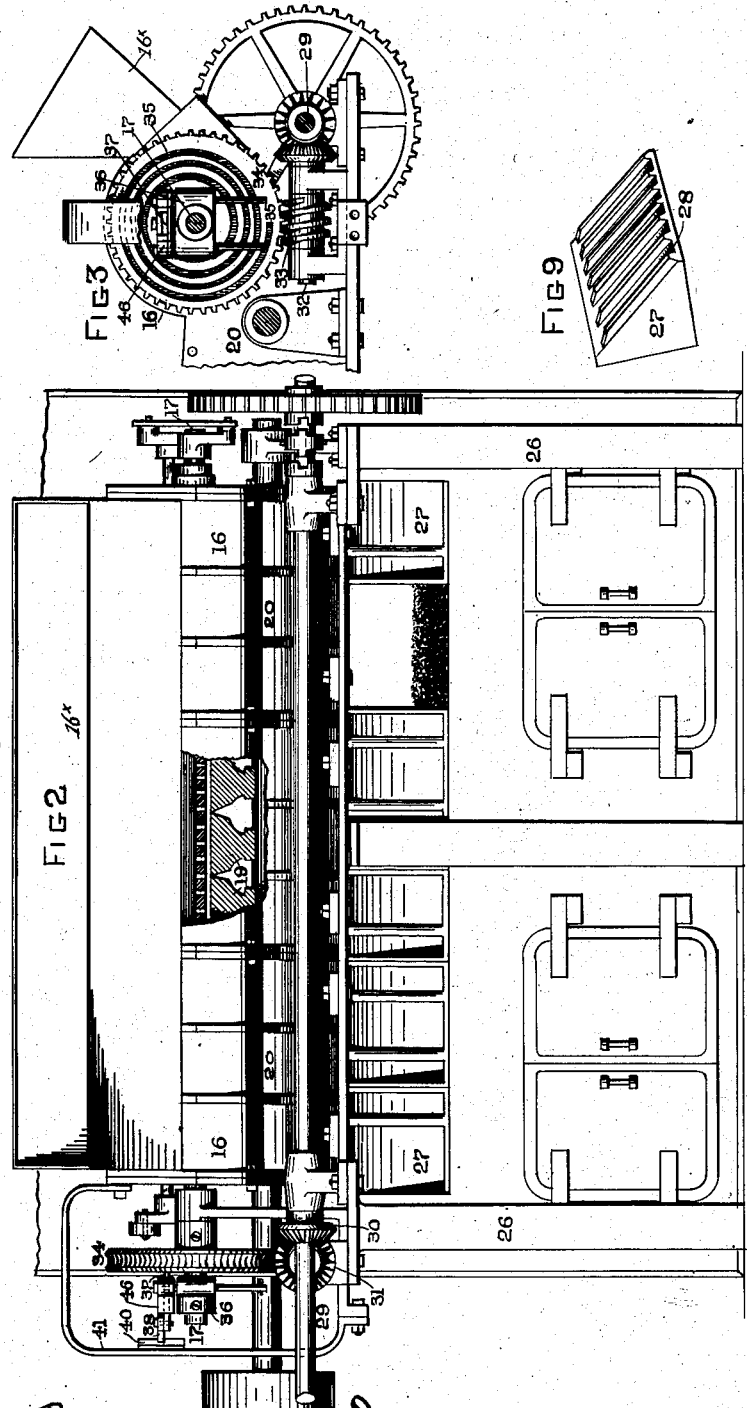

No. 823,549. PATENTED JUNE 19, 1906.
J. & W. REAGAN.
FUEL FEEDING DEVICE FOR BOILER FURNACES.
APPLICATION FILED MAY 8, 1905.
4 SHEETS—SHEET 3.
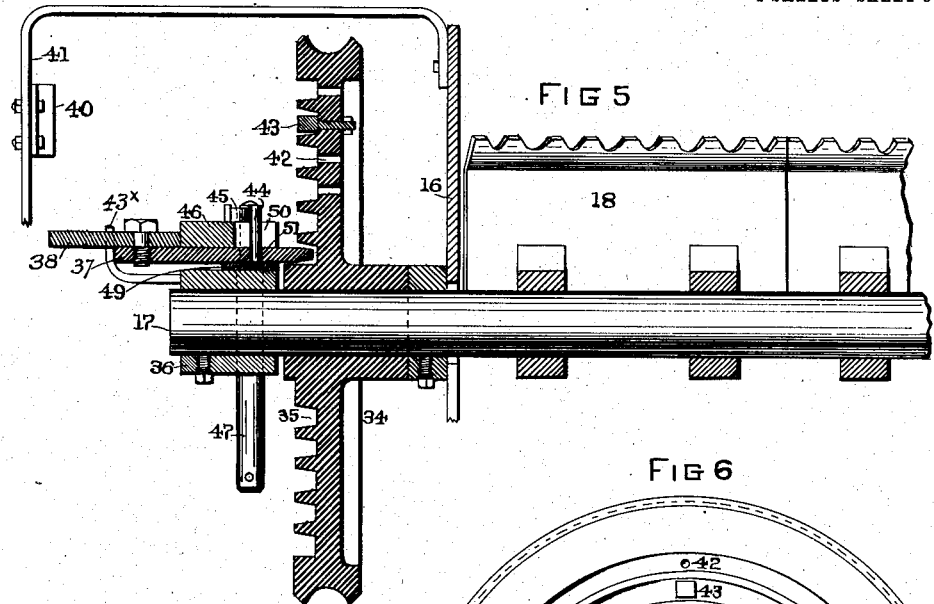
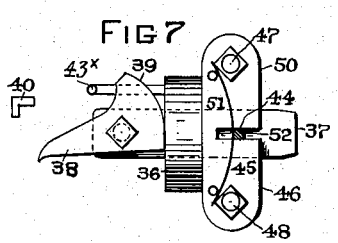
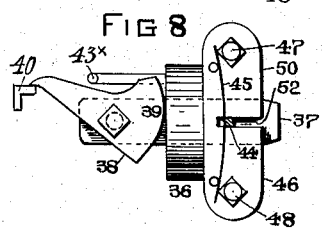
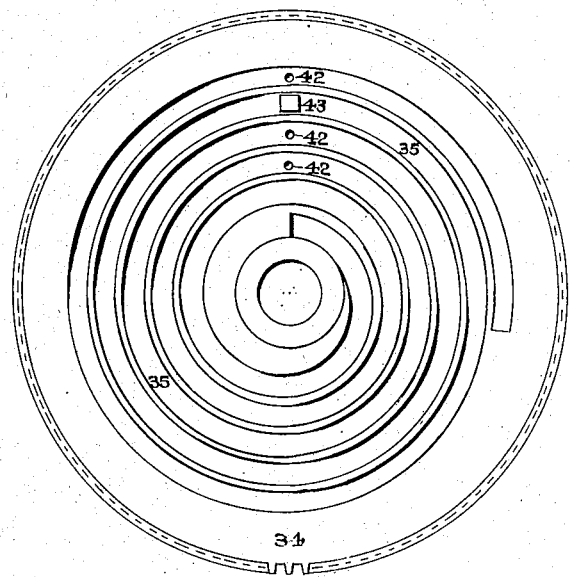
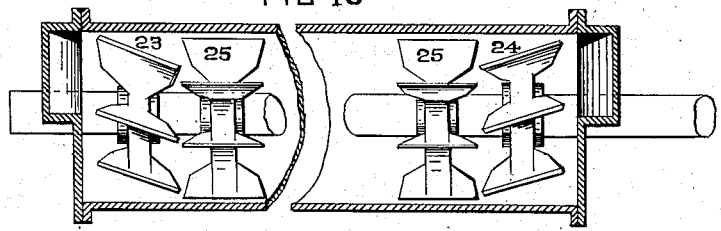
WITNESSES
Emerson Conrad
J. Geo. Tholey
—INVENTORS—
James Reagan
William Reagan
By Isaac R. Oakford
Their Attorney No. 823,549. PATENTED JUNE 19, 1906.
J. & W. REAGAN.
FUEL FEEDING DEVICE FOR BOILER FURNACES.
APPLICATION FILED MAY 8, 1905.
4 SHEETS—SHEET 4.
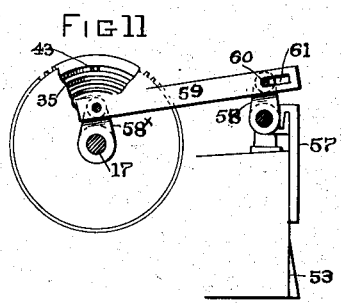
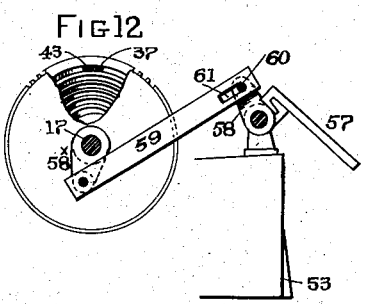
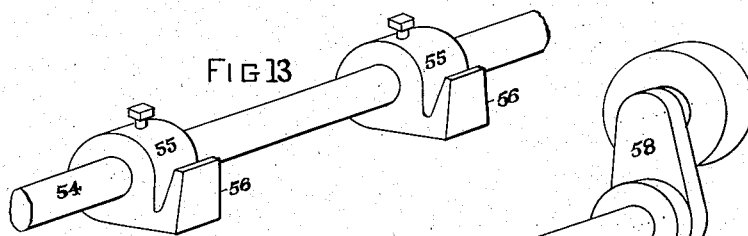
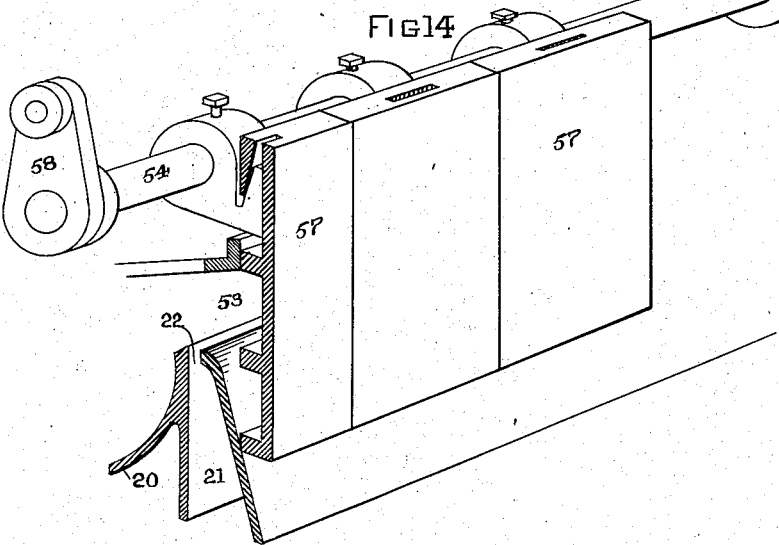

UNITED STATES PATENT OFFICE.

JAMES REAGAN AND WILLIAM REAGAN, OF PHILADELPHIA, PENNSYLVANIA.

FUEL-FEEDING DEVICE FOR BOILER-FURNACES.

No. 823,549.   Specification of Letters Patent.   Patented June 19, 1906.

Application filed May 8, 1905. Serial No. 259,273.

*To all whom it may concern:*

Be it known that we, JAMES REAGAN and WILLIAM REAGAN, citizens of the United States, residing at Philadelphia, in the county of Philadelphia and State of Pennsylvania, have invented certain new and useful Improvements in Fuel-Feeding Devices for Boiler-Furnaces, of which the following is a specification.

Our invention relates to feeders for furnaces; and its object is to produce a mechanism that will feed into a furnace at desired intervals and properly distribute a known and predetermined increment of fuel, and thereby supply the furnace with the quantity of fuel which the conditions within the combustion-chamber may demand. Our feeder is constructed to operate with more or less frequency. If the furnace is being driven, the feeding mechanism is so adjusted as to deliver the charges of fuel at short intervals, while if a slow fire is desired the adjustment will be such that the periods of inaction between successive deliveries will be prolonged. Feeders having a regular intermittent action have heretofore been employed in furnaces, such a feeder being disclosed in our Patents Nos. 767,083 and 767,084, dated August 9, 1904. This patented feeder has a revoluble cylinder, in the side of which is a groove or space for receiving at each revolution a single charge of fuel and discharging it into a casing, from which it is delivered by rotary beaters acting to uniformly spread the particles of the fuel over the fire-bed. In using this feeder it was ascertained that the fuel was too finely subdivided and that a large proportion of it was burned before it reached the surface of the fire-bed, the result being a paucity of fuel in the fire-bed and an uncontrollable combustion of the fuel while in transit from the feeder to the fire-bed.

Our present invention obviates these difficulties, the fuel being relatively large and coarse and falling upon the fire-bed without being consumed in flight. The thickness of the layer of fuel constituting the fire-bed may be increased or diminished by an adjustment of that part of the feeding mechanism upon which the frequency of the delivery of the successive charges depends. Generally speaking, the invention includes a feeder, a distributer, and driving mechanism for imparting to the feeder a periodical movement, and to the distributer, as we prefer to construct and operate it, a continuous rotary movement.

Reference is had to the accompanying drawings, in which—

Figure 1 is a vertical longitudinal section of a furnace containing our invention. Fig. 2 is a side view of the machine as it appears in front of the boiler with the central portion of the outer casing broken to show the distributer. Fig. 3 is an end view of the mechanism for operating the feeder and controlling the supply. Fig. 4 is a perspective view of one of the series of shovel-blades for supplying a measured quantity of fuel to the beaters. Fig. 5 is a longitudinal section of the mechanism for regulating the supply of fuel to the beaters. Fig. 6 is a side view of a worm-wheel, having a spiral groove on its face, forming a part of the mechanism for controlling the fuel-supply. Fig. 7 is a plan view of cross-head provided with a sliding bolt which works within the spiral groove aforesaid. Fig. 8 is a plan view of same with the bolt withdrawn from the spiral groove. Fig. 9 is a perspective view of grooved ash-retaining blocks constituting the fire-doors. Fig. 10 is a longitudinal section of the distributer-casing, showing the end beaters within the same set at an angle on the shaft to throw the fuel to the right and left. Fig. 11 is an end view of a portion of the outer casing in which the discharge-mouth is situated, showing the mechanism for operating a swinging door over the said mouth. Fig. 12 is an end view of same, showing the door open for the discharge of coal. Fig. 13 is a perspective view of a shaft and means whereby said door is suspended therefrom. Fig. 14 is a perspective view, enlarged, of a series of individual plates forming the door and means for closing and opening the same.

The feeder 15 consists of a casing 16, having attached thereto the magazine $16^{\times}$ and having at its rear side an extension forming the top wall of the passage through which the fuel is impelled by the distributer. Within the feeder-casing 16 is a shaft 17, carrying shovel-blades 18, fixedly secured thereto. The lower end of the feeder-casing is curved upward, so as to form a trough in which the base of the column of the fuel will rest. This trough prevents the fuel from passing to the distributer until it is cut away by the action of the shovel-blades, which, as will be understood, are capable of cutting out at each revolution a measured quantity of the fuel, as shown in Fig. 1.

The distributer 19 is similar to that which is disclosed in the patents previously mentioned. It, however, has an open-top casing 20, carrying on its rear side a protective plate 21, between which and the casing is an air-passage 22, through which cool air may flow to prevent the machine from becoming overheated by the heat from the furnace. That portion of the casing 16 which extends over the distributer is provided with openings to permit heat from the casing 20 to escape and allow currents of air to pass upward from the passage 22. The beaters are also slightly different from those of the previously-patented device, the blades 23 and 24 at the end of the distributer-shaft being set at an angle to the axis of the shaft, so as to throw the fuel to the right and left, while the intermediate blades 25 are arranged parallel with said shaft, as shown in Fig. 10.

Supporting-frames 26, Figs. 1 and 2, are situated at the front part of the furnace, and it is upon these frames that the feeder and the magazine, the distributer, and the driving mechanism are sustained. These frames also carry grooved ash-retaining blocks 27, which constitute the fire-doors, the ashes which accumulates in the grooves 28 of these blocks serving to protect the blocks from the heat of the furnace, the grateway to be inclined, as shown, so as to facilitate the movement of the fuel toward the rear end thereof.

The driving mechanism consists of a driving-shaft 29, beveled pinions 30 and 31, a worm-shaft 32, having a worm 33 thereon, a toothed wheel 34, having a spiral groove 35 in its outer face and loosely supported on the feeder-shaft 17, multiple-part cross-head 36, fixed on the feeder-shaft, a spring-actuated bolt 37, mounted to slide in said cross-head and normally protruding into the spiral groove in the face of toothed wheel 34, a pivoted finger 38, carried by the bolt and having a cam-surface 39 engaging the cross-head, and a detent 40, supported by a bracket 41 and lying in the path of movement of the pivoted finger 38 as it revolves with the feeder-shaft. The spiral groove of the toothed wheel 34 has holes 42 disposed at certain intervals, into any one of which a stud 43 may be inserted, and the spring-actuated bolt is provided with an upwardly-extending pin 44, against which a flat spring 45 acts to normally cause the bolt to be protruded and extend into the aforesaid spiral groove 35. The cross-head is provided with a movable part 46, to which are connected paralleled rods 47 and 48, extending loosely through holes in the main body of the cross-head, so as to constitute guides for said movable part 46, which remains normally in contact with the cross-head proper. This movable part of the cross-head 36 consists of two plates 49 and 50, bolted together. One of these plates 50 has a channel 51 therein for the reception of the spring-actuated bolt 37, and it is cut away or slotted at 52, so as to leave room for the pin 44 as it reciprocates with the said bolt, as shown in Figs. 5, 7, and 8.

The power for operating the feeder and the distributer may be applied to the machine through gearing which is common to the feeder and the distributing mechanism, or it may be applied separately to each of these mechanisms.

When the driving-shaft 29 of the driving mechanism for the feeder is revolved, the power is transmitted, through the beveled pinions 30 and 31 and the worm-shaft 32 and its worm 33, to the toothed wheel 34, causing said wheel to revolve, and thereby compel the spring-actuated bolt 37 to traverse the spiral groove 35 in its face. The movable part 46 of the cross-head is thus moved upwardly away from the main body of same, as shown in Figs. 2, 3, and 5. The toothed wheel 34 continues to revolve until the bolt 37 strikes the stud 43, whereupon the toothed wheel and the feeder-shaft 17 turn in unison for a single revolution or until the pivoted finger 38 strikes the detent 40, which now lies in its path, and by the action of its cam-surface 39, Figs. 5, 7, and 8, against the body of the cross-head causes the spring-actuated bolt 37 to recede and withdraw from the spiral groove 35 and its engagement with the stud 43 therein. When this occurs, the movable part 46 drops by gravity and is restored to its normal position on the body of the cross-head 36. In the meantime the pivoted finger 38 is brought in contact with an upwardly-curved stud 43×, which projects from and revolves with the cross-head 36, and in this manner the said cam element 38 39 is returned to its original position. The mechanism is then ready for another operation. It is of course understood that the revolution of the feeder-shaft 17 has caused the shovels 18 on said shaft to deliver a single charge of the fuel from the magazine to the distributers, as shown in Fig. 1, and that the frequency of the successive deliveries for any given speed of revolution of the toothed wheel and its driving elements is governed by the distance from the generating-point of the spiral groove to the stud measured by the length of said groove. If the stud is placed in a hole which is near said generating-point, the frequency of delivery will be greater; but if it is set in a remotely-situated hole the feeding will be relatively infrequent. By this means the feeder will be readily thrown into and out of action, and variations in the turning thereof may be produced at will.

In the method of throwing and spreading the fuel, as we have herein described, we have found that it (the fuel) forms a highly inflammable gas which instantly flashes into flame when it reaches the bed of fuel and produces an intense heat, thereby increasing the heating capacity of the furnace as well as the boiler capacity.

In order to protect the beaters and interior of the machine from the intense heat of the furnace, a door is arranged to work automatically from the feed-shaft 17 to open and close the discharge-mouth 53 at intervals, as shown in Figs. 11, 12, and 14.

The shaft 54, Figs. 13 and 14, carries a series of collars 55, provided on one side with hooks 56, upon which the individual plates 57, forming the door proper, are hung. These plates can be attached or removed separately in case one or more should burn out or become warped. The shaft 54 bears on one end a crank 58, and the corresponding end of the feeder-shaft 17 is furnished with a similar crank 58×, motion being communicated from the said shaft by means of the connecting-rod 59.

The pin 60 in the crank 58 works within a slot 61 to permit lost motion during certain part of the revolution.

It will be observed, Fig. 11, that when the door is closed both cranks 58 and 58' are in a vertical position at the upper half of the stroke, and as the crank 58' moves toward the left on the downstroke it carries with it the connecting-bar 59. The crank-pin 60 in the meantime has traversed and is in contact with the outer end of the slot 61, while the crank 58' continues its downward stroke until it has about reached the lower half. This movement draws the crank 58 toward the left and opens the door 57, as shown in Fig. 12. On the upstroke of the crank 58' the pin moves in the slot until the inner end is reached, when as the crank still continues to revolve the crank 58 is pushed upon and the door closed, as shown in Fig. 11.

What we claim in our invention, and desire to secure by Letters Patent, is—

1. The combination of means for delivering successive charges of fuel, and a driving mechanism therefor including devices for automatically and intermittingly disconnecting it from said means, substantially as described.

2. A feeder for furnaces including a driving mechanism for intermittingly actuating said feeder, the driving mechanism being provided with a member carrying an element which is adapted to automatically and periodically engage with another element of said mechanism, and thereby cause the feeder to operate to deliver a single charge of fuel, substantially as described.

3. A feeder for furnaces including a driving mechanism for intermittingly actuating said feeder, the driving mechanism being provided with a member carrying an adjustable element which is adapted to automatically and periodically engage with another element of said mechanism, and thereby cause the feeder to operate to deliver a single charge of fuel, substantially as described.

4. A feeder for furnaces including a driving mechanism for intermittingly actuating said feeder, the driving mechanism being provided with a rotary member having a series of holes and carrying a stud insertible in any of said holes, and said driving mechanism being also furnished with an element adapted to be periodically engaged by said stud and with means for automatically producing the engagement, substantially as described.

5. A furnace having in connection a rotary shaft carrying shovels, a spirally-grooved wheel mounted loosely thereon, driving means for said wheel, a spring-actuated bolt carried by the shaft normally extending into the spiral groove, a stud in said spiral groove and means for retracting said bolt after a single revolution of said shaft, substantially as described.

6. A furnace-feeder having in combination a rotary shaft carrying shovels, a spirally-grooved wheel mounted loosely thereon, a stud in the spiral groove, means for driving said wheel, a two-part cross-head carried by the shaft, a spring-actuated bolt extending through one part of the cross-head, guides connected to said part of the cross-head and extending through the other part thereof, a cam mounted on said bolt and a detent lying in the path of the said cam so as to withdraw said bolt from the path of said stud after one revolution of the feeder-shaft, substantially as specified.

7. The combination of a rotary feeder, intermittently-acting operating means therefor, a furnace, and fuel-door situated at the entrance of said furnace, and mechanism for causing said door to open when the fuel is being supplied to the combustion-chamber and to close when a charge of fuel has entered the furnace, substantially as described.

8. A fuel-feeder for furnaces consisting of a distributer having a series of rotary blades or beaters, mounted upon a single shaft, a series of shovel-blades mounted upon a secondary shaft, having an intermittent operation, and an automatic driving mechanism, having an adjustable element adapted to periodically move into contact with an adjacent element of same mechanism, and thereby cause the entire mechanism to operate and deliver a single charge of fuel, substantially as described.

In testimony whereof we have affixed our signatures in presence of two witnesses.

JAMES REAGAN.
WILLIAM REAGAN.

Witnesses:
EMERSON CONRAD,
J. GEO. WHALEY.